United States Patent
Dovgodko et al.

(10) Patent No.: US 6,351,537 B1
(45) Date of Patent: Feb. 26, 2002

(54) VERIFIABLE HOLOGRAPHIC ARTICLE

(75) Inventors: Sergiy Dovgodko, Brussels (BE); Domenica Kirchmeyer, Grevenbroich (DE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/166,653

(22) Filed: Oct. 5, 1998

(51) Int. Cl.$^7$ .................................................. G09C 5/00

(52) U.S. Cl. ........................................................ 380/54

(58) Field of Search ....................... 283/17, 73; 380/54; 359/2

(56) References Cited

U.S. PATENT DOCUMENTS

| | | |
|---|---|---|
| 3,643,216 A | 2/1972 | Greenaway et al. |
| 4,210,346 A | 7/1980 | Mowry, Jr. et al. ......... 283/8 B |
| 4,856,857 A | 8/1989 | Takeuchi et al. ............. 350/3.6 |
| 5,169,707 A | 12/1992 | Faykish et al. ............. 428/195 |
| 5,200,794 A | 4/1993 | Nishiguma et al. ........... 356/71 |
| 5,374,976 A | 12/1994 | Spannenburg .............. 355/201 |
| 5,379,131 A | 1/1995 | Yamazaki ...................... 359/2 |
| 5,396,559 A | 3/1995 | NcGrew ...................... 380/54 |
| 5,426,520 A | 6/1995 | Kakae et al. ................... 359/2 |
| 5,510,171 A | 4/1996 | Faykish ....................... 428/195 |
| 5,524,933 A | 6/1996 | Kunt et al. ..................... 283/67 |
| 5,694,229 A | * 12/1997 | Drinkwater et al. ............ 359/2 |
| 5,712,731 A | 1/1998 | Drinkwater et al. ........ 359/619 |
| 5,715,316 A | * 2/1998 | Steenblick et al. ........... 380/54 |
| 5,729,365 A | 3/1998 | Sweatt .......................... 359/2 |
| 5,737,298 A | 4/1998 | Suhan ........................ 369/110 |
| 5,742,411 A | 4/1998 | Walters .......................... 359/2 |
| 5,825,547 A | * 10/1998 | Lee .............................. 359/567 |
| 5,896,208 A | * 4/1999 | Dausmann et al. ............. 359/2 |
| 5,999,280 A | * 12/1999 | Huang ............................ 359/2 |

FOREIGN PATENT DOCUMENTS

| | | | |
|---|---|---|---|
| AU | 30325/95 | 3/1996 | .......... G06K/19/16 |
| CN | 113400 5 A | 10/1996 | .......... G09C/5/00 |
| DE | 34 19 859 | 1/1985 | .......... B44F/1/12 |
| DE | 196 12 819 | 10/1997 | .......... B44F/1/12 |
| DE | 196 35 752 | 3/1998 | |
| EP | 0 328 086 B1 | 8/1989 | .......... G06K/19/06 |
| EP | 0 353 974 | 2/1990 | .......... B41M/3/14 |
| EP | 0 490 457 B1 | 6/1992 | .......... B42D/15/00 |
| EP | 0 585 076 | 3/1994 | ............. C09J/7/02 |
| EP | 0 715 232 A2 | 6/1996 | .......... G02B/5/22 |
| FR | 2 688 615 | 9/1993 | .......... G06K/19/16 |
| GB | 2 317 237 | 3/1998 | |
| JP | 9-152828 | 6/1997 | ............. G03H/1/26 |
| JP | 10-143621 | 5/1998 | ............. G06K/17/00 |
| RU | 2096834 | 11/1997 | ............. G09F/3/00 |
| TW | 324811 | 1/1998 | .......... G06K/19/16 |
| WO | WO 95/12860 | 5/1995 | ............. G06K/7/10 |
| WO | WO 95/27627 | 10/1995 | ............. B44F/1/12 |
| WO | WO 96/14992 | 5/1996 | .......... B42D/15/00 |
| WO | WO 97/46920 | 12/1997 | ............. G03H/1/00 |

OTHER PUBLICATIONS

*English Language Abstract.
J.H. Hong, "Holography," Kirth–Othmer Encyclopedia of Chemical Technology, Fourth Edition, vol. 13, pp. 338–357 (1995).

(List continued on next page.)

*Primary Examiner*—Gail Hayes
*Assistant Examiner*—Jeff Leaning
(74) *Attorney, Agent, or Firm*—Lucy C. Weiss; Carolyn V. Peters

(57) ABSTRACT

A verifiable holographic article comprises a substrate comprising (a) at least one hologram; and (b) at least one covert image that is convertible to an overt image using a decoding sampling device, e.g., a photocopier, that produces an aliasing or moire effect. The article cost-effectively provides both "first line" and "second line" security features and can be easily, quickly, and safely verified or authenticated.

19 Claims, 1 Drawing Sheet

OTHER PUBLICATIONS

Aestron Design, Editors Joris Baas–Joseph Rath–Steven Tuinstra.

S.P. McGrew, "Hologram Counterfeiting: Problems and Solutions," pp. 1–6, (http://www.iea.com//~nli/publications/counterfeit.html).

Holobank Security Holograms, (http://www.hmt.com/holosecure/).

S. Spannenburg, "Optically–and Machine–Detectable Copying Security Elements," SPIE Proceedings, vol. 2659, pp. 76–96 (1996).

C. Outwater et al., "Practical Holography," 1995 Dimensional Arts Inc., (http://www.holo.com//holo/book/book1.html).

The Holography Handbook, "Theory", pp. 300–333.

S.P. McGrew, "CounterMeasures Against Hologram Counterfeiting," pp. 1–15, (http://www.iea.com/~nli/publications/countermeasures.html).

S.P. McGrew, "Holographic Technology for Anti–Counterfeit Security: Present and Future," pp. 1–5, (http://www.iea.com//~nli/publications/anticounterfeitsecurity.html).

* cited by examiner

VERIFIABLE HOLOGRAPHIC ARTICLE

FIELD OF THE INVENTION

This invention relates to security articles comprising a hologram.

BACKGROUND OF THE INVENTION

Holograms have been commonly used as authenticating or security devices because they have been considered difficult to manufacture and to reproduce or copy. Holograms are records of an interference pattern formed by light at a recording location and can be manufactured by first illuminating an object with a coherent light beam, e.g., a laser beam. Light reflected from the object is allowed to strike a light sensitive recording medium such as a photographic film or plate, and, simultaneously, a reference beam (comprising a portion of the light from the light source) is directed so as to bypass the object and to strike the recording medium directly. (Thus, the light incident on the recording medium is the sum of the light reflected from the object and the reference beam.) When the recording medium is later illuminated by coherent light (i.e., a laser beam or sunlight), an observer sees a virtual image of the object, which appears to exist in 3D space. Some types of holograms are visible even in non-coherent light (e.g., diffused light).

Holograms have commonly been incorporated into credit cards and the like as anti-fraud devices, with the idea that forgers do not have the requisite sophisticated equipment for manufacturing the holograms. However, forgers have developed counterfeiting methods. One response to the increased prevalence of counterfeiting has been to produce holograms of increasing complexity, but this has also led to increased cost. Other approaches have relied upon the use of covert images and special authentication or verification equipment, e.g., a laser, to enable the detection of such images, but such equipment has often been expensive and difficult to use. Thus, there is a continuing need in the art for secure holographic articles that are extremely difficult to counterfeit, that can be cost-effectively produced, and that can be easily and inexpensively authenticated or verified under field conditions.

SUMMARY OF THE INVENTION

Briefly, in one aspect, this invention provides a verifiable holographic article comprising a substrate comprising (a) at least one hologram; and (b) at least one covert image that is convertible to an overt image using a decoding sampling device, e.g., a photocopier, that produces an aliasing or moire effect. Preferably, the covert image is a high frequency image that is substantially imperceptible to the human eye, and that is created by first removing the frequency components of an original, overt image that are greater than half the sampling frequency of the decoding sampling device and then mirroring the remaining frequency components about the axes that correspond to half of the sampling frequency.

The verifiable holographic article of the invention cost-effectively provides both "first line" (hologram) and "second line" (covert image) security features, thereby increasing the difficulty of counterfeiting (which requires sophisticated knowledge in fields beyond holography) and improving the level of security of the holographic article. Yet the article can be easily, quickly, and safely verified or authenticated using a photocopier or other simple sampling device, without the need for, e.g., expensive, difficult to use, and potentially dangerous laser detection equipment.

In other aspects, this invention also provides a security label or security laminate comprising the verifiable holographic article of the invention and a kit comprising the article and a decoding sampling device.

BRIEF DESCRIPTION OF THE DRAWINGS

These and other features, aspects, and advantages of the present invention will become better understood with regard to the following description, appended claims, and accompanying drawings, wherein:

Figure 1B:
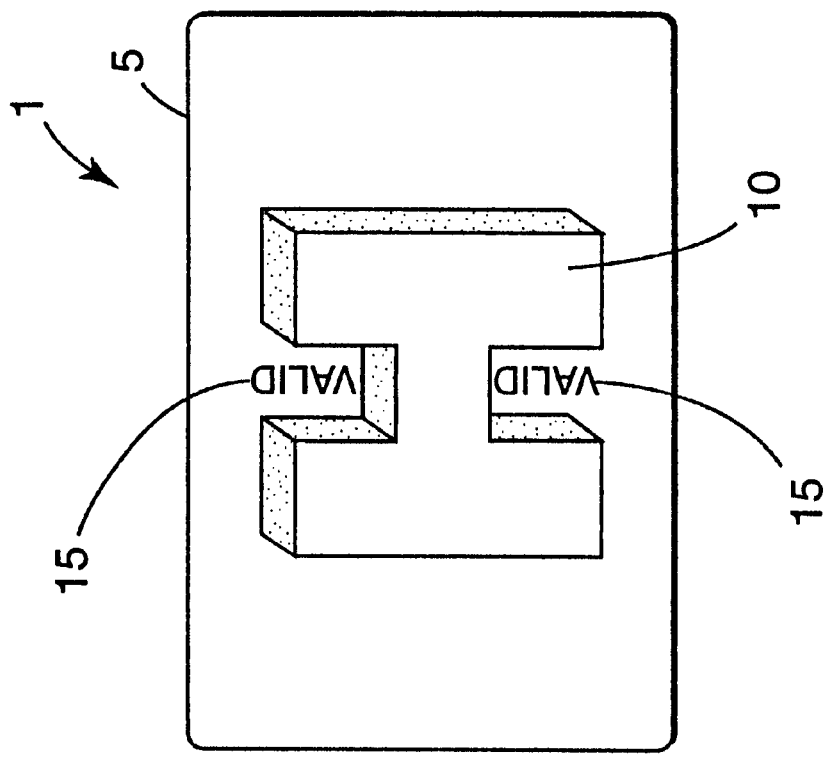
FIGS. 1a and 1b show top views of an embodiment of the verifiable holographic article of the invention before and after, respectively, application of a decoding sampling device to convert the covert (hidden) images of FIG. 1a to the overt (visible) images of FIG. 1b.

These figures, which are idealized, are not drawn to scale and are intended to be merely illustrative and nonlimiting.

DETAILED DESCRIPTION OF THE INVENTION

REFERENCE NUMERALS

Figure 1A:
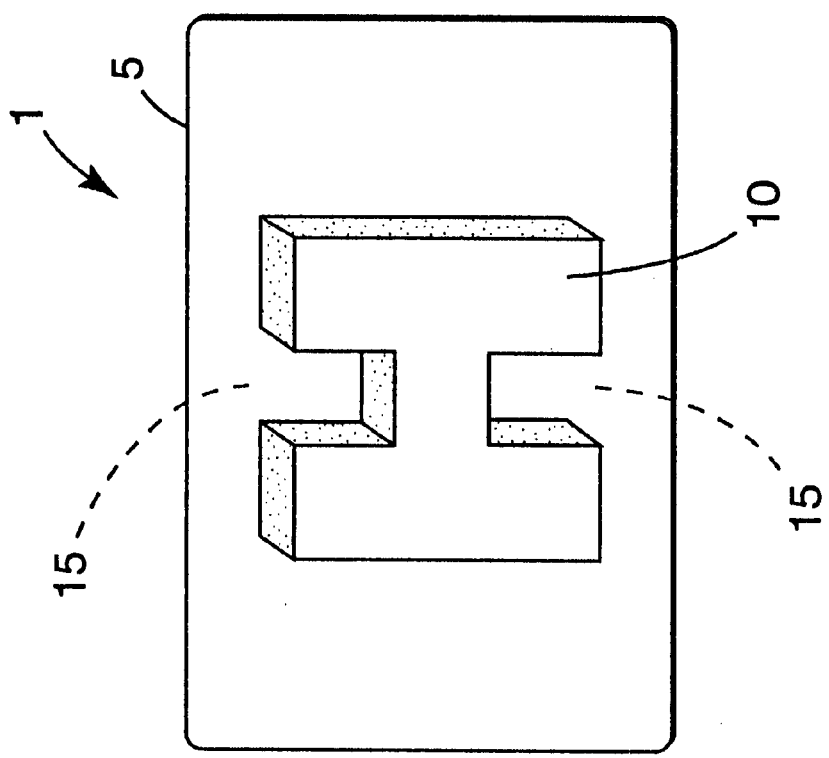

1 Verifiable Holographic Article
5 Substrate
10 Hologram
15 Covert Images (FIG. 1a); Overt Images (FIG. 1b)

The verifiable holographic article of the invention can be better understood by reference to the accompanying drawings, where FIG. 1a shows an embodiment of the article 1 of the invention wherein a substrate 5 comprises a hologram 10 and covert images 15. The hologram 10 can be of any of the types known in the art to be viewable or reconstructible without the use of a monochromatic coherent light source, e.g., a laser. Such types of holograms (sometimes termed "sunlight-viewable" or "white light-viewable" holograms) include, e.g., reflection, transmission, true color, and composite holograms. The substrate 5 can be of any of the materials known in the art to be useful for producing and/or incorporating such types of holograms, e.g., photopolymer films, photographic films, photochromic glasses/crystals, dichromated gelatin, thermoplastic materials, photorefractive crystals, embossable reflective materials (e.g., metallized papers, metallized polymers, and metal foils), and the like, and combinations thereof. Useful holograms and substrates therefor include, e.g., those described in U.S. Pat. No. 4,856,857 (Takeuchi et al.), the description of which is incorporated herein by reference.

Preferably, the hologram is a transmission hologram (more preferably, a rainbow hologram), and the substrate is a reflective substrate, e.g., metal foil, metallized paper, or metallized polymeric film. More preferably, the substrate is metal foil, most preferably, aluminum foil. The foil preferably has a thickness of less than about 10 microns, so that it is extremely difficult to remove the foil from a security article to which it has been applied, without at least partially tearing or destroying the foil.

The covert images 15 are hidden images that can be converted to overt (visible) images using a decoding sampling device, e.g., a digital copying device or photocopier, that produces an aliasing or moire effect. Preferably, the device produces an aliasing or moire effect for a sufficient number of frequencies of the covert images to make the images at least partially visible (more preferably, substantially visible) to the human eye. The covert images can be produced by screen angle modulation techniques. However, the covert images are preferably created by first removing the frequency components of one or more original, overt images that are greater than half the sampling frequency of the decoding sampling device and then mirroring the remaining frequency components about the axes that correspond to half of the sampling frequency.

The covert images 15 are more preferably prepared by a method comprising the steps of (a) determining the Fourier transform (converting from the spatial domain to the frequency domain) of at least a portion of an original, overt image that has been sampled or generated by, e.g., a computer; (b) removing all of the frequency components of the Fourier transform that are greater than half of the sampling frequency of a decoding sampling device that is selected for the decoding of that portion of the image; (c) mirroring the remaining frequency components of the Fourier transform about the axes that correspond to half of the sampling frequency; and (d) determining the inverse Fourier transform (converting from the frequency domain back to the spatial domain) of the resulting mirrored frequency components.

Covert images 15 prepared by this method can be converted to overt images 15 (shown in FIG. 1b) using a decoding sampling device that samples at twice the frequency on which the above-described removal and mirroring steps were based. Such a sampling device will (according to the Sampling Theorem) be unable to reproduce the frequencies of the covert image that are greater than one half the sampling frequency of the device and will instead produce an aliasing effect by which these frequencies are again mirrored about the axes corresponding to half the sampling frequency. The frequencies are thereby shifted into the frequency range that is visible to the human eye (spatial frequencies of less than about 250 cycles (or dots) per inch (2.54 cm) at a viewing distance of about 1 foot (about 30 cm)), converting the covert image to an overt image.

Digital copiers or laser scanners can be used in this manner as verification or authentication devices that "undersample" the covert image, produce an aliasing effect (whereby the covert image is converted to an overt image), and reproduce the overt image on, e.g., a sheet of paper. (If desired, a correlation analysis, or comparison of the resulting overt image with a stored version of the original image on which the covert image was based, can also be carried out.) Alternatively, however, any simple optical device that enables the human eye to sample in the spatial domain at a particular sampling frequency can also be utilized for verification. Such a device might, e.g., be as simple as a polymeric sheet (e.g., a substantially transparent polymeric sheet) comprising a pattern or array of elements (produced, e.g., using a diffuse printing technique) having a selected, preferably substantially regular, spacing that produces a desired sampling frequency function.

Reproduction or copying of the covert images, rather than conversion of the covert images to overt images, can occur if the sampling frequency of a particular digital copier is high enough to meet the requirements of the Sampling Theorem for those covert images. However, as will be recognized by those skilled in the art, such reproduction or copying by commercially available digital copiers (that scan at spatial frequencies of from about 400 to about 600 cycles (or dots) per inch (2.54 cm)) can be prevented by the proper selection of the frequency on which the above-described removal and mirroring steps are based.

The hologram 10 and the covert images 15 can be arranged in any desired manner, but are preferably either adjacent to each other or arranged such that one surrounds the other. More preferably, the covert images are integrated into the hologram (e.g., by including the covert images as one of the angular views used in constructing a 2D/3D hologram). Incorporation of the hologram and the covert images in the substrate 5 can be carried out by any of the methods known in the art for producing or copying holograms. Preferably, embossing techniques are utilized. If desired, an overt image can be superimposed on the covert image, provided that any frequencies of the overt image (e.g., high, non-visible frequencies) that can substantially interfere with the decoding of the covert image are first removed.

Objects and advantages of this invention are further illustrated by the following examples, but the particular materials and amounts thereof recited in these examples, as well as other conditions and details, should not be construed to unduly limit this invention.

EXAMPLES

Example 1

This example describes the preparation of a verifiable holographic article comprising an embossed metal foil.

Two original digital images (one to be used for producing an overt hologram, and the other to be used for producing a covert image) were created, arranged in a selected pattern (wherein the images were adjacent to each other), and recorded in an original pattern file using Illustrator™ software (available from Adobe Corporation, San Jose, Calif., USA Next, using the same software, five different high resolution graphic files were created from the original pattern file. Each of the five graphic files contained a different requisite view of the original image that was destined to become the overt hologram (for each of five different viewing angles), but the view of the second original image (destined to become the covert image) was the same in each of the five files.

In parallel, a two-dimensional fast Fourier transformation was carried out on the Illustrator™ file containing the original image destined to become a covert image. The mirroring axis for each dimension was positioned at ½ of the sampling frequency of a selected decoding sampling device. For each dimension, the frequencies that were higher than the mirroring frequency were dropped. The frequencies that were lower than the mirroring frequency were then mirrored into the high frequency area. Since an overt image was not to be used to mask the covert image, there were no frequencies added to the area below the mirror frequency. Finally, a two-dimensional inverse Fourier transformation was effected to produce a covert image file containing the covert image in the spatial domain.

The covert image was then pasted over its corresponding overt image in each of the five graphic files. Each of the five files were printed using a very high resolution output device onto a transparent film as a black and white negative image.

A photo-resist plate was created using the five negative films by exposing the plate in such a manner that the resulting rainbow hologram would have specified color shifts with variation of the viewing angle. The photo-resist plate was then used to make an embossing tool (or shim) by a nickel electro-forming process. The shim was reproduced by this process so that enough identical shims were available to cover the surface of a master embossing roll.

The master embossing roll was used to heat emboss a hot stamping foil (a standard aluminum hot-stamping foil commonly employed for embossing holograms) borne on a 19 micron thick polyester (polyethylene terephthalate or PET) carrier. The final result was a web comprising a 19 micron polyester carrier bearing a 5 micron thick aluminum foil layer comprising the embossed images.

The aluminum foil layer bearing the hologam and the covert image was hot-stamped to the surface of a security paper. The security paper bearing the embossed hot-stamping film was used as a substrate for printing security documents using security printing techniques. The authenticity of selected security documents was verified by first observing the holographic image (first line inspection) and by then using the decoding sampling device (second line inspection), which made the covert image visible by producing an aliasing effect.

Example 2

Example 1 is repeated using a hologram image that has the geometry of a washer-shaped circular band. The hologram image and the covert image are arranged such that the covert image is located in the center of, and surrounded by, the hologram image.

Various modifications and alterations of this invention will become apparent to those skilled in the art without departing from the scope and spirit of this invention.

What is claimed is:

1. A verifiable holographic article comprising a substrate comprising (a) at least one hologram; and (b) at least one covert image that is convertible to an overt image using a decoding sampling device that produces an aliasing or moiré effect, wherein said covert image is created by a process comprising the steps of (a) removing any frequency components of an original, overt image that are greater than half the sampling frequency of said decoding sampling device; and (b) mirroring the remaining frequency components about the axes that correspond to half of said sampling frequency.

2. The article of claim 1 wherein said device produces an aliasing or moire effect for a sufficient number of frequencies of said covert image to make said covert image at least partially visible to the human eye.

3. The article of claim 1 wherein said covert image is prepared by a process comprising the steps of (a) determining the Fourier transform of at least a portion of an original, overt image; (b) removing all of the frequency components of said Fourier transform that are greater than half of the sampling frequency of a decoding sampling device that is to be used for the decoding of said portion of said image; (c) mirroring the remaining frequency components of said Fourier transform about the axes that correspond to half of said sampling frequency; and (d) determining the inverse Fourier transform of the resulting mirrored frequency components.

4. The article of claim 1 wherein said hologram is viewable or reconstructible without the use of a monochromatic coherent light source.

5. The article of claim 4 wherein said hologram is selected from the group consisting of reflection, transmission, true color, and composite holograms.

6. The article of claim 5 wherein said hologram is a transmission hologram.

7. The article of claim 1 wherein said hologram is a rainbow hologram.

8. The article of claim 1 wherein said substrate is selected from the group consisting of photopolymer films, photographic films, photochromic glasses/crystals, dichromated gelatin, thermoplastic materials, photorefractive crystals, embossable reflective materials, and combinations thereof.

9. The article of claim 8 wherein said substrate comprises an embossable reflective material.

10. The article of claim 9 wherein said embossable reflective material is selected from the group consisting of metal foil, metallized paper, and metallized polymeric film.

11. The article of claim 10 wherein said embossable reflective material is metal foil.

12. The article of claim 11 wherein said metal foil is aluminum foil.

13. The article of claim 1 further comprising an overt image superimposed on said covert image.

14. The article of claim 1 wherein said covert image is integrated into said hologram.

15. A verifiable holographic article comprising a substrate comprising (a) at least one rainbow hologram; and (b) at least one covert image that is prepared by a process comprising the steps of (i) determining the Fourier transform of at least a portion of an original, overt image; (ii) removing all of the frequency components of said Fourier transform that are greater than half of the sampling frequency of a decoding sampling device that is to be used for the decoding of said portion of said image; (iii) mirroring the remaining frequency components of said Fourier transform about the axes that correspond to half of said sampling frequency; and (iv) determining the inverse Fourier transform of the resulting mirrored frequency components.

16. The article of claim 15 wherein said substrate comprises an embossable reflective material and wherein said hologram and said covert image are embossed on said substrate.

17. A kit comprising (a) a verifiable holographic article comprising a substrate comprising (a) at least one hologram; and (b) at least one covert image that is convertible to an overt image using a decoding sampling device that produces an aliasing or moiré effect, wherein said covert image is created by a process comprising the steps of (a) removing any frequency components of an original, overt image that are greater than half the sampling frequency of said decoding sampling device; and (b) mirroring the remaining frequency components about the axes that correspond to half of said sampling frequency and (b) a decoding sampling device.

18. The kit of claim 17 wherein said decoding sampling device comprises a polymeric sheet comprising a pattern or array of elements having a selected spacing that produces a desired sampling frequency function.

19. A security label or security laminate comprising the article of claim 1.

* * * * *